United States Patent [19]
Paul, deceased et al.

[11] Patent Number: 4,957,415
[45] Date of Patent: Sep. 18, 1990

[54] POLYESTER COMPOSITE PROPELLER SPINNER AND METHOD OF MAKING SAME

[75] Inventors: Roy D. Paul, deceased, late of Windsor, by Janice W. Paul, executrix; Walter Pollock, West Simsbury, both of Conn.

[73] Assignee: United Technologies Corporation, Hartford, Conn.

[21] Appl. No.: 120,740

[22] Filed: Nov. 12, 1987

Related U.S. Application Data

[63] Continuation-in-part of Ser. No. 852,036, Apr. 14, 1986, abandoned.

[51] Int. Cl.$^5$ .................. B29C 35/02; B63H 1/20
[52] U.S. Cl. .................. 416/245 R; 264/122; 264/257
[58] Field of Search ....... 264/122, 257, 113, DIG. 53; 416/245 R, 245 A, 241 A, 230

[56] References Cited

U.S. PATENT DOCUMENTS

| 3,074,111 | 1/1963 | Wiltshire | 264/DIG. 53 |
| 4,000,956 | 11/1977 | Carlson et al. | 416/230 |
| 4,031,601 | 6/1977 | Staub et al. | 264/258 |
| 4,088,525 | 5/1978 | Gowetski et al. | 156/173 |
| 4,127,636 | 11/1978 | Flanders | 264/113 |
| 4,229,497 | 10/1980 | Piazza | 264/257 |
| 4,350,789 | 9/1982 | Rowe | 525/31 |
| 4,647,418 | 3/1987 | McDougal | 264/137 |

OTHER PUBLICATIONS

Oleesky et al., Handbook of Reinforced Plastics, 1964, pp. 105-106.
Improving the Crack Resistance of BMC and SMC, by F. J. McGarry, E. H. Rowe and C. K. Riew; 32nd Annual Technical Conference 1977, Reinforced Plastics/Composites Institute, The Society of the Plastic Industry, Inc. Sec. 16 C.

Primary Examiner—Jan H. Silbaugh
Assistant Examiner—Mary Lynn Fertig

[57] ABSTRACT

A polyester composite propeller spinner (1) has a conical wall (2), radial internal support gussets (3), and means for attaching to a propeller hub. Improved impact strength is achieved by combining a vinyl terminated liquid reactive compound with a polyester resin and adding a plurality of fiberglass fibers. The fiberglass fibers are in at least two fiber lengths, having a 2:1 ratio of long to short fibers. A propeller spinner formed from such a composition has an impact strength of greater than 4.84 Kg-m (35 ft-lbs).

3 Claims, 1 Drawing Sheet

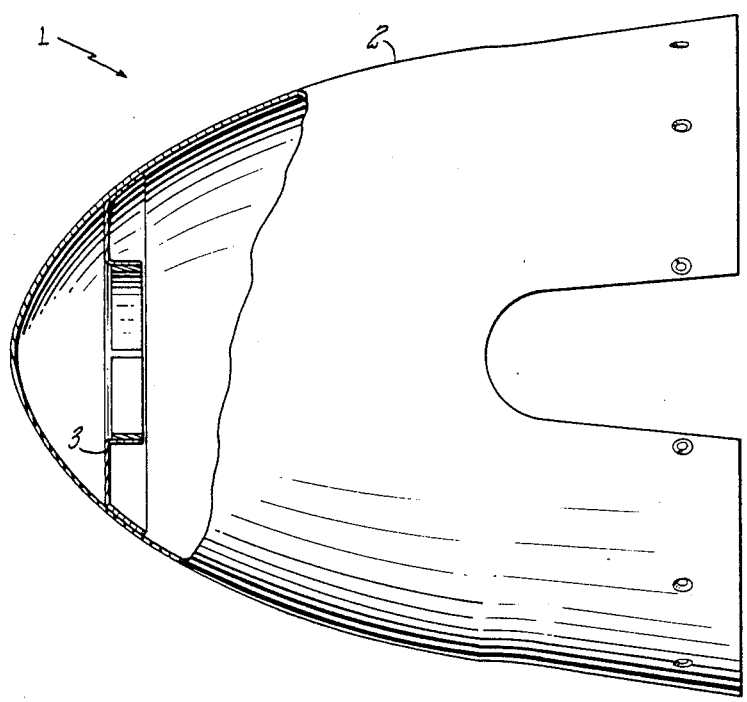

POLYESTER COMPOSITE PROPELLER SPINNER AND METHOD OF MAKING SAME

This application is a continuation-in-part of prior application Ser. No. 852,036 filed Apr. 14, 1986, now abandoned.

Technical Field

This invention relates to propeller spinners and more particularly to polyester composite propeller spinners.

BACKGROUND ART

Propeller spinners comprise the central nose portion of a propeller, providing an aerodynamically shaped cap which covers and protects the attaching assembly which couples the propeller to a drive shaft. Propeller spinners, including those made from polyester composite materials, are known in the art.

During operation, various foreign objects, such as birds or dislodged ice, may contact an engine by striking the propeller spinner. Generally, polyester composite propeller spinners, utilizing a polyester resin and about 35% by weight of a glass fiber filler, were thought to have sufficient impact strength to resist damage from such object strikes. However, damage has occurred in some propeller spinners which were struck by ice dislodged from the propeller blades. After an evaluation of the impact damage, it was determined that the standard impact strength of 3.32 Kg-m (24 ft-lbs), measured using a drop impact test, is inadequate to assure safe operation of a polyester composite propeller spinner.

Several changes in the resin or fiber filler can be made to increase impact strength. For instance, the filler can comprise glass fibers of greater length. Generally, the use of longer fibers embedded in a matrix resin promotes increased impact strength. However, the length of fiber is generally limited to the maximum length which the glass fiber chopping equipment can provide. Also, handling characteristics and workability are adversely affected as the fibers get longer. Maintaining 35% by weight of glass fiber while increasing the fiber length to the maximum provided by a typical chopping machine, produces a 17% improvement in impact strength, from the base impact strength of 3.32 Kg-m (24 ft-lbs) to a final impact strength of 3.87 Kg-m (28 ft-lbs). However, processing time is increased due to the adverse effects on workability.

Additives are also known in the art for improving the impact strength of polyester composites. In particular, rubbery polymers such as carboxyl terminated butadiene-styrene copolymer may be added to a polyester resin to improve impact strength and toughness. However, such rubbery polymers have the additional effect of flexibilizing the resin matrix, decreasing the composite stiffness and lowering the heat resistance. These changes in the structural properties of a propeller spinner are undesirable.

Another additive known in the art for improving impact strength is a vinyl terminated liquid reactive compound, which improves the impact strength of a polyester composite without detrimentally flexibilizing the resin matrix or changing other structural properties of the resin. The addition of the vinyl compound to a polyester resin using standard length fibers adds 1.10 Kg-m (8 ft-lbs) to the impact strength of a polyester composite propeller spinner, for a total impact strength of 4.42 Kg-m (32 ft-lbs). While a 33% improvement over the standard propeller spinner, it does not provide the impact strength required to prevent ice impact damage.

A change in the type of fiber, for example from glass to carbon, could add significantly to impact strength. However, such carbon fibers are on the order of 12 times as expensive as glass fibers and are not considered an economically acceptable alternative.

DISCLOSURE OF THE INVENTION

It is an object of the present invention to provide a polyester composite propeller spinner having sufficient impact strength to prevent damage from foreign object strikes on the propeller spinner.

It is a further object of the present invention to provide a propeller spinner that economizes on the fibrous filler type and quantity, while maintaining optimum workability.

It is yet a further object of the present invention to provide a propeller spinner that optimizes impact strength without major changes in manufacturing processes or equipment.

These and other objects of the present invention are achieved by modifying the underlying resin matrix material by the addition of a vinyl terminated liquid reactive compound, and then, subsequently combining the modified resin with variable length glass fibers. In particular, an impact resistant propeller spinner is produced by adding a vinyl terminated liquid reactive compound to a matrix polyester resin, and, combining the resin with a glass fiber filler material which comprises a 2:1 ratio of larger to smaller fibers. The composite is then molded to shape and cured to the final propeller spinner form. By combining these modifications, a total improvement in impact strength of 50-58% (4.98-5.25 Kg-m) is achieved without adversely affecting workability or requiring manufacturing process or equipment changes. Such a result is unexpected as one skilled in the art would expect a maximum impact strength of 4.79 Kg-m from the combined changes.

BRIEF DESCRIPTION OF THE DRAWINGS

The Figure is an elevation of the preferred embodiment of the propeller spinner of the present invention.

BEST MODE FOR CARRYING OUT THE INVENTION

Referring to FIG. 1, a propeller spinner 1 has a conically shaped wall 2, a plurality of radial internal support gussets 3, and means for attaching to a propeller hub. Such a propeller spinner is generally made of a polyester composite material comprising a polyester resin and glass fiber mixture. For illustrative purposes, a polyester resin such as Laminac® 4123, manufactured by the Chemical Division of U. S. Steel Corporation, is used to fabricate the preferred embodiment of the propeller spinner of the present invention. While Laminac® 4123 is described, other polyester resins could similarly benefit from this invention. Generally, various additives are combined with the matrix resin to adjust various structural properties or improve workability. Such additives vary with each particular application but the choice of additive has no effect on the benefits of the present invention. For the illustrative propeller spinner, such additives comprise benzoyl peroxide as a curing agent, styrene monomer as a thinner, and aluminum silicate as a filler. In the propeller spinner of the present invention a vinyl terminated liquid reactive compound is added to the matrix polyester resin. Such a compound may comprise a copolymer of butadiene and acrylonitrile with terminal and pendant reactive vinyl groups. For example, Hycar ® VTBNX, which is a vinyl terminated liquid reactive compound made by B. F. Goodrich Company, the composition of which is disclosed in U.S. Pat. No. 4,350,789 to Rowe et al, is used in the preferred embodiment. 10-14 parts by weight of the vinyl compound are added per 100 parts of the polyester resin.

TABLE

| Propeller Spinner Materials of Construction | Drop Impact Strength, Kg-m |
|---|---|
| Polyester resin, 35% by weight glass fiber, 5 cm length | 3.32 |
| Polyester resin, 35% by weight glass fiber, 10 cm length | 3.87 |
| Polyester resin, with a vinyl compound, 35% by weight glass fiber, 5 cm length | 4.42 |
| Polyester resin, with a vinyl compound, 35% by weight glass fiber, 10 cm length | 4.98-5.25 |
| Polyester resin, with a vinyl compound, 35% by weight glass fiber, 10 cm and 5 cm mix, 2:1 ratio | 4.98-5.25 |

After preparing the resin-vinyl mixture, glass fibers are combined with the resin. Such fibers may comprise E glass fibers which have a circular cross section and a width of 7 microns. To achieve the desired impact strength while maintaining optimum workability, a randomly oriented 2:1 ratio of long to short fibers are added to the polyester resin. The random orientation is achieved by blending the resin and fiber mixture into one mass to distribute the long and short fibers throughout the mixture. Another way this could be achieved is by adjusting the chopping machine to deliver both long and short fibers in a near simultaneous operation. Such a combination provides the impact strength expected of longer fibers with the workability of shorter fibers. From the Table, it can be seen that a change from 5 cm to 10 cm fiber produces an impact improvement of 0.55 Kg-m (4 ft-lbs). However, workability of the composite mix is impaired utilizing all 10 cm fibers. By reducing the content of 10 cm fiber, down to a 2 to 1 ratio of long fibers to short fibers, one skilled in the art would expect a proportionate reduction in impact strength, from 0.55 Kg-m (4 ft-lbs) to 0.37 Kg-m (2.68 ft-lbs). However, the impact strength unexpectedly achieves a 0.55 to 0.83 Kg-m improvement, for a final impact strength of 4.98 to 5.25 Kg-m (36-38 ft-lbs) when combined with the vinyl compound, rather than the expected 4.79 Kg-m (34.68 ft-lbs), and does so while providing the workability characteristics of all 5 cm fiber.

The polyester resin/glass fiber composite material is molded to the proper shape and cured. For the illustrative propeller spinner, the material is molded with a conical wall, incorporating a plurality of radial internal support gussets, and having means for attaching to a propeller hub.

While a propeller spinner requiring improved impact strength is discussed, it will be understood by those skilled in the art that any modifications in the propeller spinner shape, curing means or resin formulation can be made without varying from the scope of the present invention.

We claim:

1. An improved method for producing an impact hardened polyester composite propeller spinner having a conical wall, a plurality of radial internal support gussets, and means for attaching to a propeller hub, said method comprising combining a polyester resin with a plurality of glass fibers, molding to a final form, and curing, said improvement comprising:

(a) adding a vinyl terminated liquid reactive compound to said polyester resin, and (b) combining said resin with about 35% by weight of a randomly oriented mixture of glass fibers having two fiber lengths, in a two to one ratio of long to short fibers respectively, said short fibers being about 5 cm in length and said long fibers being about 10 cm in length.

2. The method of claim 1 wherein 10-14 parts by weight of said compound are added per 100 parts of said resin.

3. An impact hardened polyester composite propeller spinner produced in accordance with the method of claims 1 or 2.

* * * * *